June 26, 1962

R. M. HOLLOWAY ET AL 3,040,844

ARRANGEMENT TO CONTROL POWER SOURCE
MOVEMENT VIA SLACK ELIMINATION IN
A BRAKE RIGGING OR THE LIKE

Filed April 28, 1958

INVENTORS.
Robert M. Holloway
Robert L. Ludington
By Neil J. Driscoll
Atty.

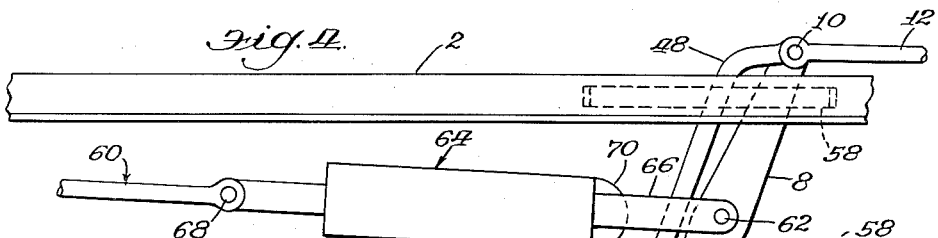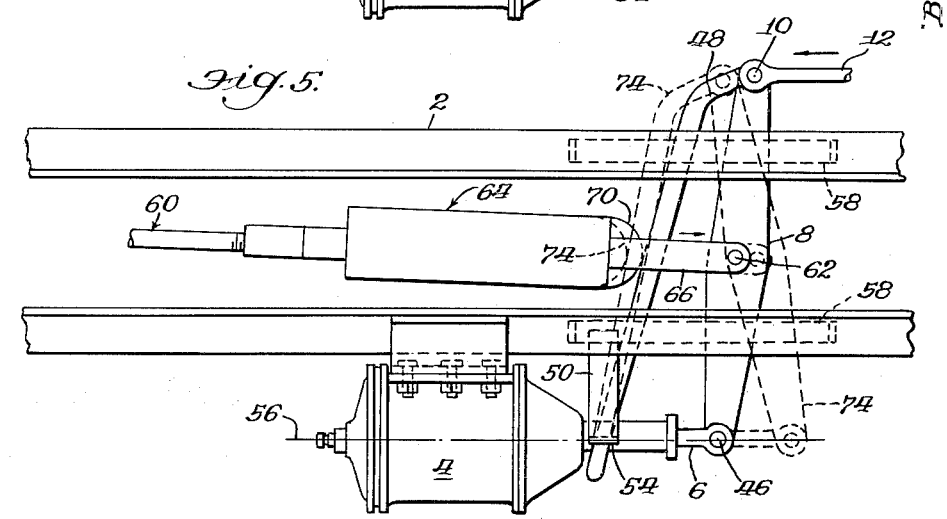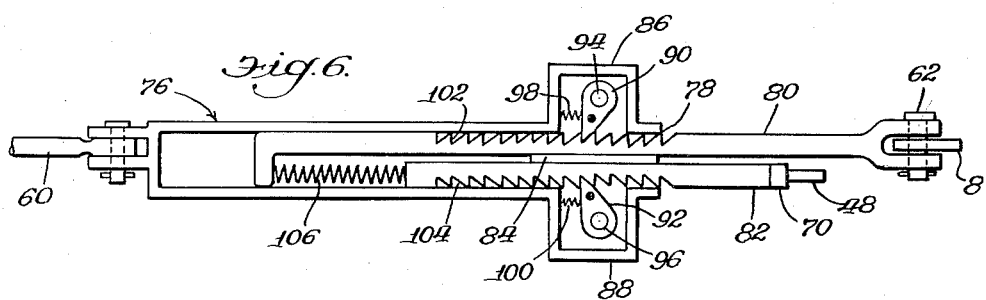

INVENTORS.
Robert M. Holloway
Robert L. Ludington

June 26, 1962
R. M. HOLLOWAY ET AL
3,040,844
ARRANGEMENT TO CONTROL POWER SOURCE
MOVEMENT VIA SLACK ELIMINATION IN
A BRAKE RIGGING OR THE LIKE
Filed April 28, 1958
9 Sheets-Sheet 4
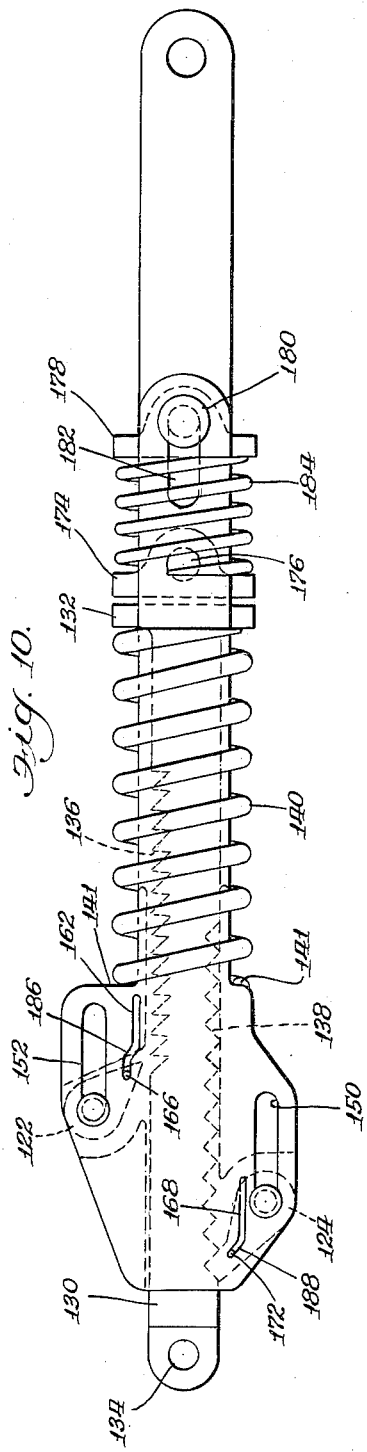
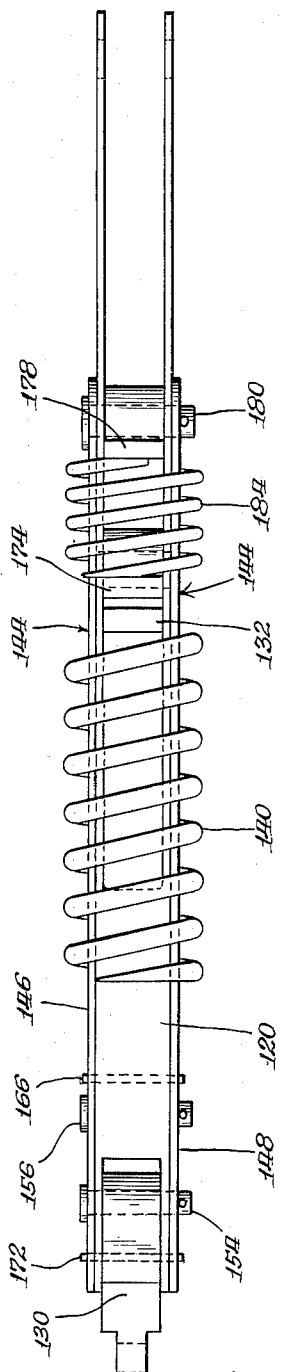
INVENTORS.
Robert M. Holloway
Robert L. Ludington
By: Neil J. Donnell
Atty.

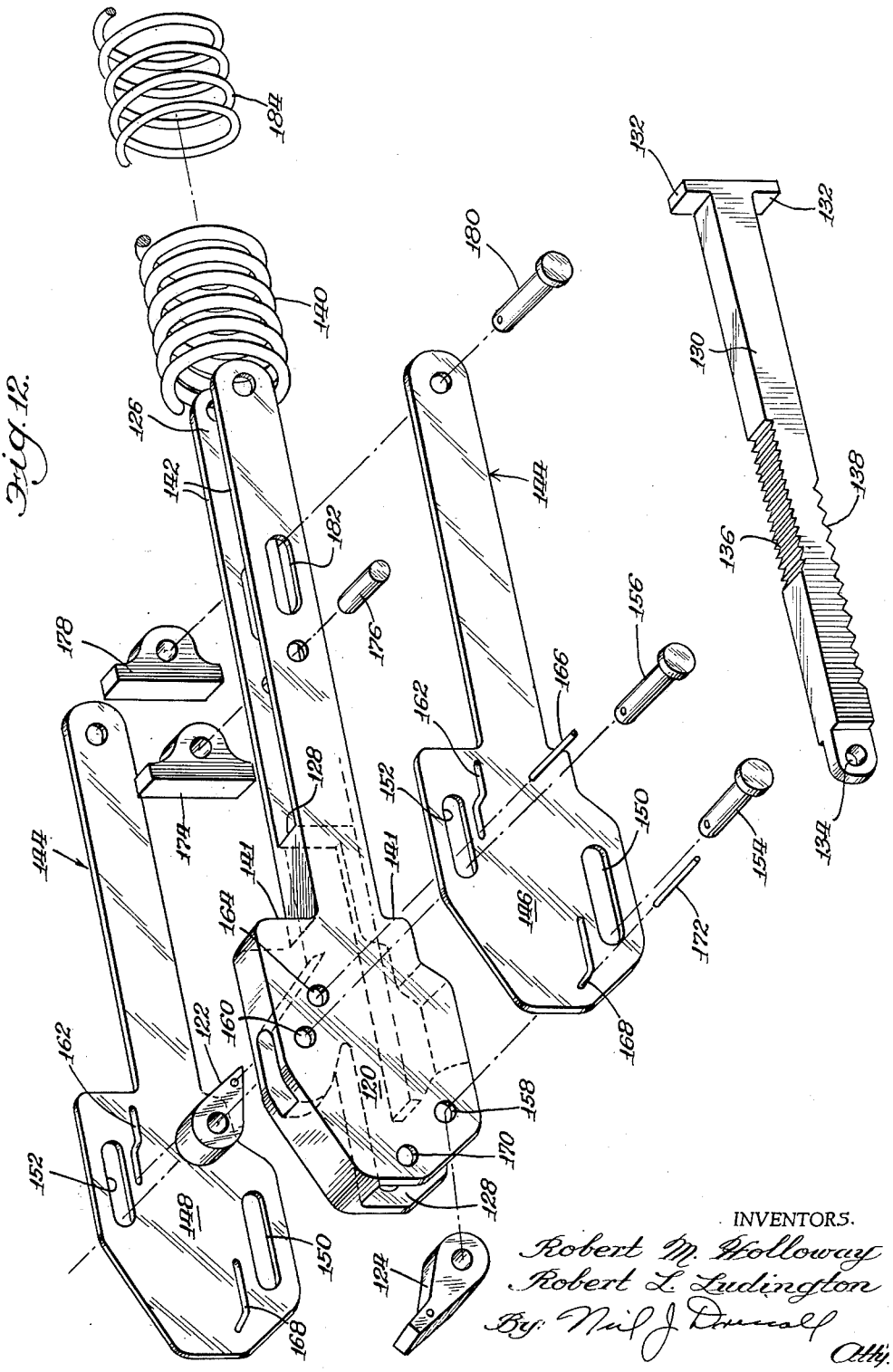

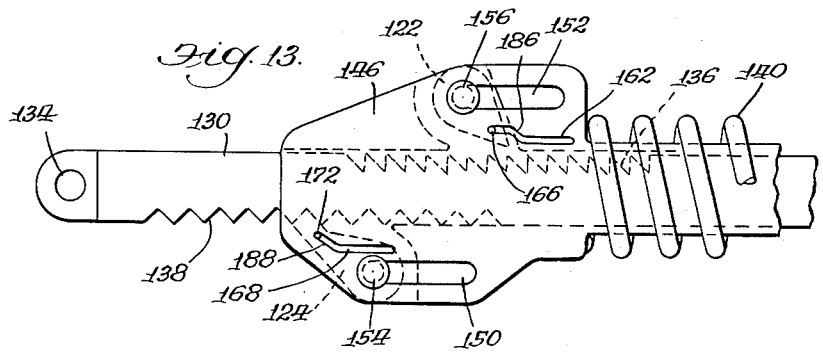
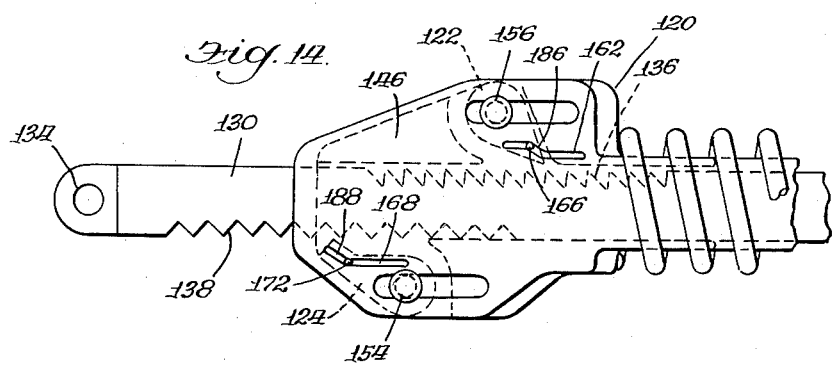
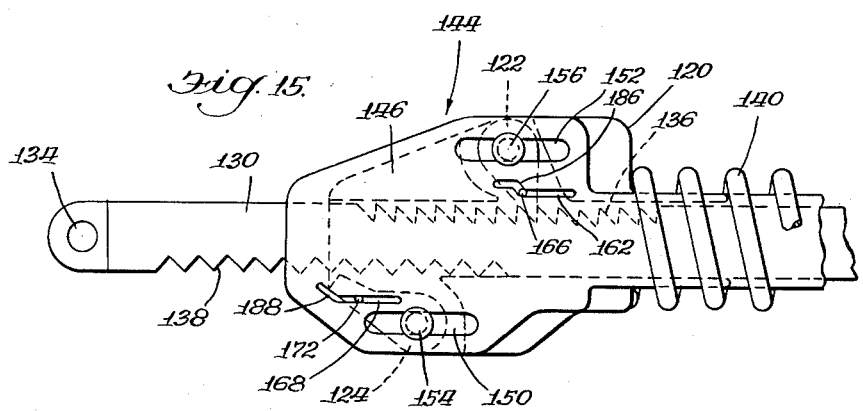

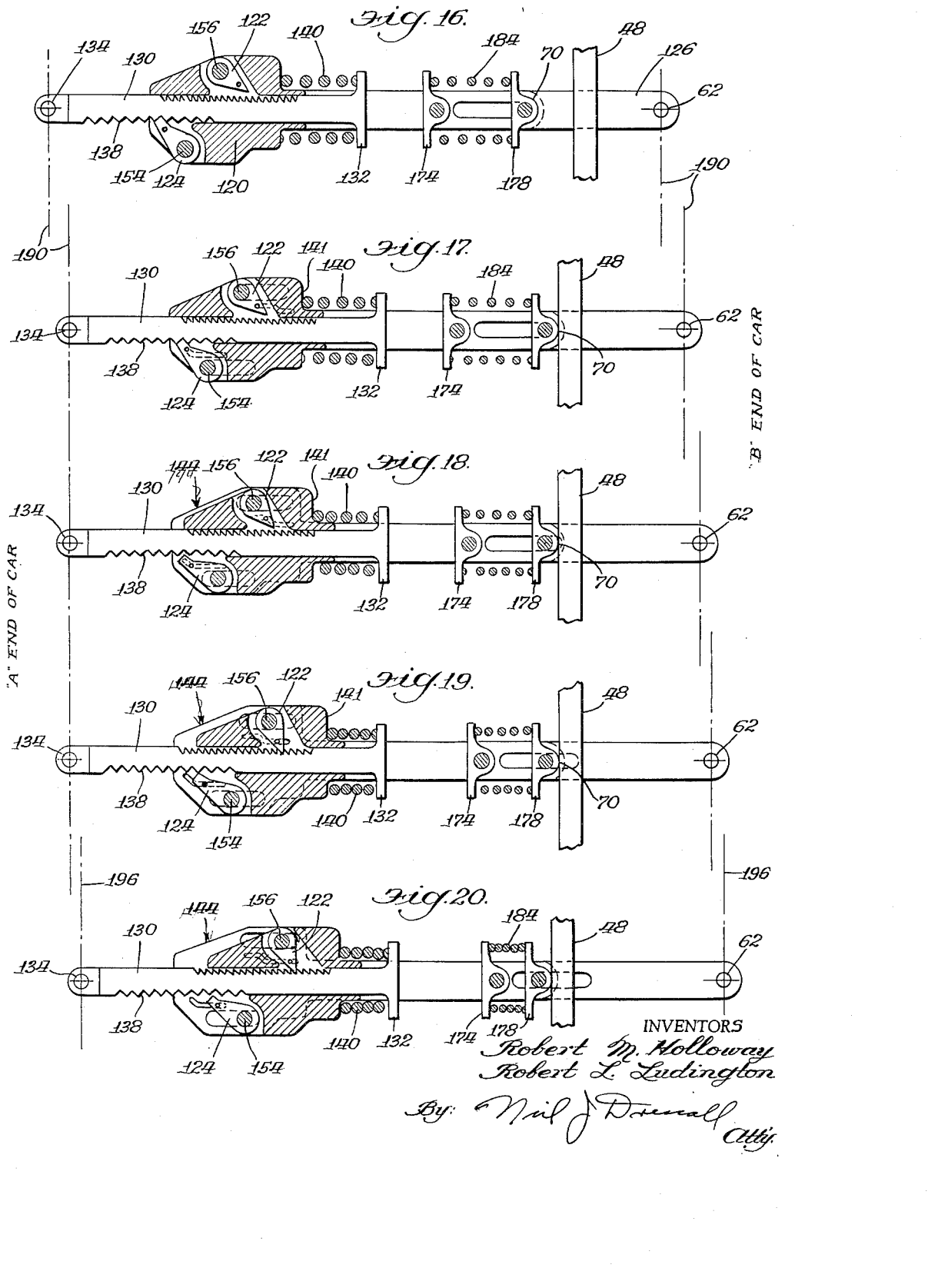

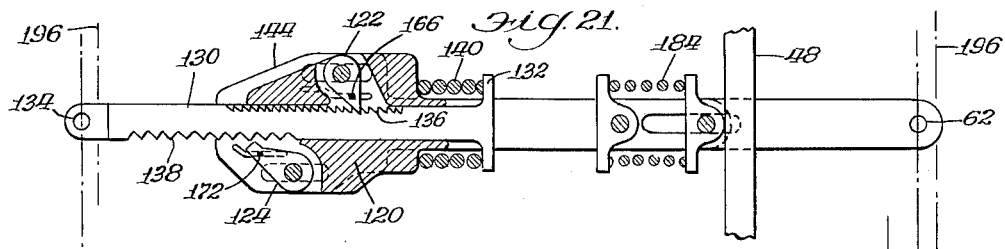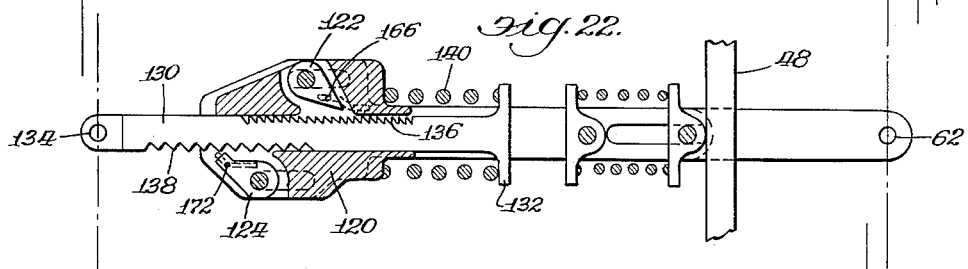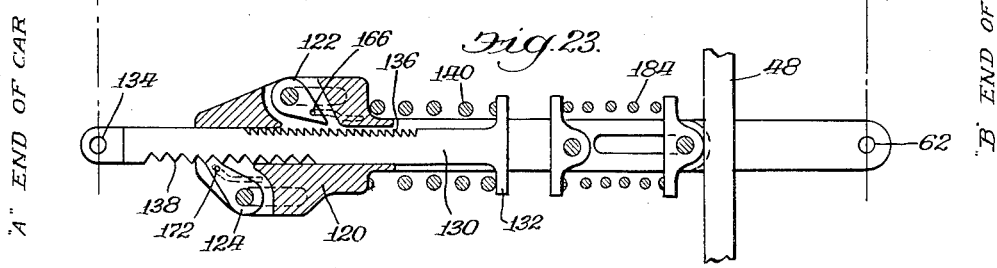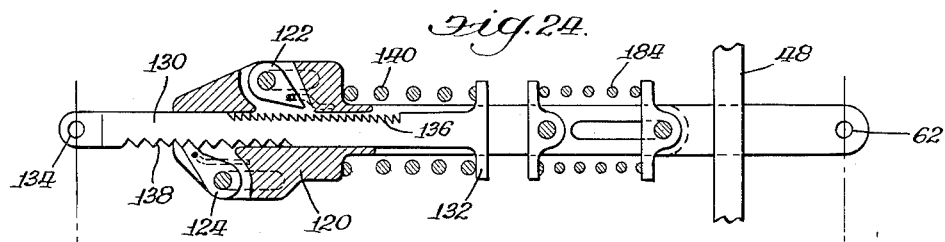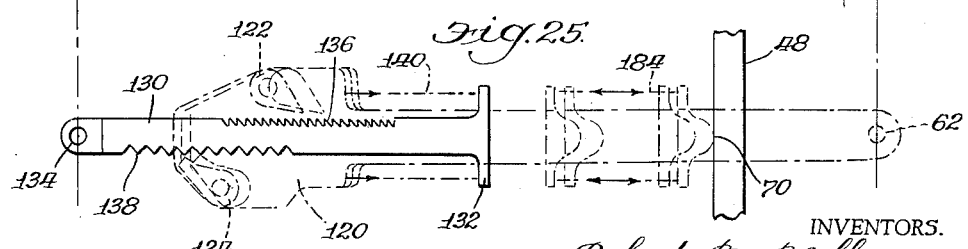

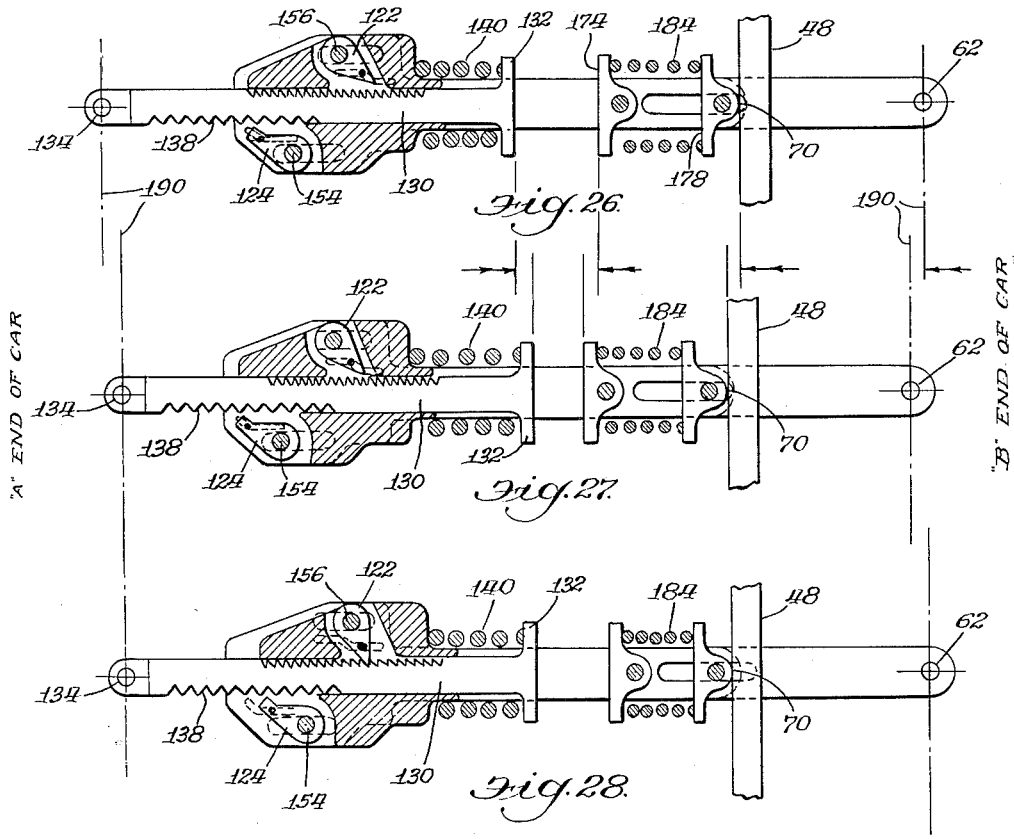
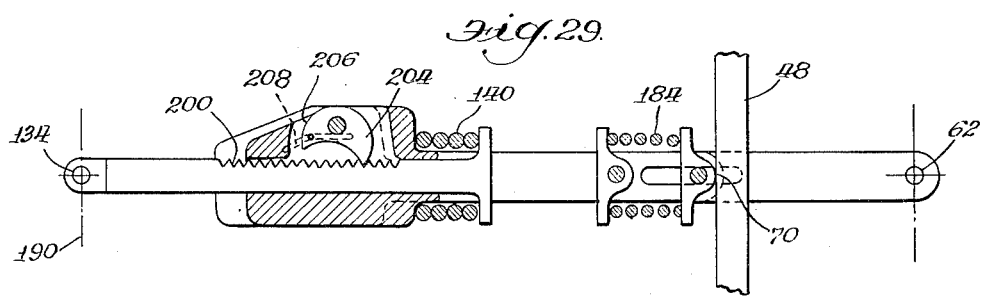

United States Patent Office 3,040,844
Patented June 26, 1962

3,040,844
ARRANGEMENT TO CONTROL POWER SOURCE MOVEMENT VIA SLACK ELIMINATION IN A BRAKE RIGGING OR THE LIKE
Robert M. Holloway, 408 Springland Ave., and Robert L. Ludington, 219 E. 7th St., both of Michigan City, Ind.
Filed Apr. 28, 1958, Ser. No. 731,244
12 Claims. (Cl. 188—200)

The invention relates to power transmission systems, and particularly to an arrangement useful in controlling power source movement via slack elimination in such systems, and has particular utility as applied to brake riggings for railway rolling stock or the like.

Considering the application of the herein disclosed invention to railway rolling stock, those skilled in the art will understand that a primary source of power, such as a cylinder-piston arrangement, is usually provided on each railway freight car or the like. This cylinder-piston arrangement is usually of the fluid operated type, and is generally air-actuated. Railway rolling stock is provided with sources of air under pressure, said source or reservoir being operatively connected to the brake cylinders on the individual units or cars of the train. Upon brake application, the air under pressure is admitted to each cylinder, and linear piston and connected push-rod movement results. Typical railway braking arrangements provide braking members such as shoes adjacent the peripheral wheel surfaces of the car. To provide shoe movement, a brake rigging which is in essence a linkage arrangement operatively interconnects the push-rod with the braking shoes or members. This linkage arrangement typically involves a series of interconnected live levers, dead or fulcrum levers and connecting rods, illustrative arrangements of which are hereinafter shown and described.

Those familiar with this art will further understand that the reservoir of air or fluid under pressure available in railway rolling stock is of necessity limited. Further, the rigging generally is designed to provide an optimum braking force or pressure at the wheel surfaces only under a determined movement of the push-rod. Needless to say, it is desirable to provide the optimum braking pressure under all conditions of rolling stock operation. Any departure from this optimum braking position reduces braking efficiency in that either excessive braking pressure results, or reduced braking pressure results. The key, therefore, in obtaining substantially optimum braking efficiency in railway rolling stock, is providing an arrangement that will effectively maintain primary power source movement—that is, push-rod movement—at or near the determined design distance or length.

To properly understand the disclosed arrangement, it may be desirable to review certain causes of the departure of push-rod travel from the optimum distance. Logically, this departure can be in only one of two directions, that is, excessively long piston travel or excessively short piston travel.

Considering the former, that is, excessively long piston travel, it usually results from excessive slack appearing in the brake rigging. Without detailing all the causes of such slack appearance, it will be readily appreciated that brake shoe wear, wheel wear, rigging wear (that is, wear at the operative connections between the various elements of the rigging), and rigging deformation, or a combination of these causes, produces excessive slack in the rigging generally. With the appearance of such slack, the brake cylinder piston and connected push-rod must move a distance in excess of the optimum or design distance in order to bring the brake shoe members into braking position with the wheel surfaces. Remembering that the reservoir of air under pressure is limited on this equipment, it will be apreciated that excessive piston movement at each brake cylinder increases the volume of air received by each cylinder, resulting in a brake application at a force below the desired optimum. The dangers incident to the existence of such a condition will be obvious when one considers modern high-speed train operation.

Referring to piston travel shorter than the desired optimum, it will be understood, for example, that the replacement of worn parts of the rigging, such as brake shoes, without proper readjustment of the rigging generally, can induce this condition. As noted above, a condition of short piston travel and excessive braking pressures could result in wheel locking and wheel sliding against the rails, reducing over-all braking efficiency. In addition, wheel locking can result in wheel flat spots and uneven braking effect among the individual cars in the train, this latter effect causing undesirable over-all train operation which incidentally works a hardship on other operating train components. In short, any substantial departure of the push-rod movement from the optimum, which is reflected by excessively short or long piston and push-rod travel, is an undesirable condition that should be avoided if possible.

With the above in mind, it is a general object of the invention to provide an arrangement of the type herein considered that will effectively control brake cylinder piston and push-rod movement at substantially the optimum design distance.

It is a further object of the invention to provide a simple and effective arrangement to sense the existence of a rigging condition that departs from the desired optimum, such arrangment also being operative to transmit such sensed intelligence to a device which will correct such condition through the full range of rigging operation, that is, from no-wear rigging condition to full or maximum-wear rigging condition.

It is a further object of the invention to provide, in combination with the sensing arrangement mentioned in the preceding paragraph, several novel devices which may be arranged to receive said transmitted intelligence and induce rigging adjustment, returning the rigging to substantially the optimum condition and thereby maintaining the desired piston and push-rod travel.

It is a specific object of the invention to provide rigging adjustment devices of the type referred to in the preceding paragraph, that are automatic in operation.

It is also a specific object of the invention to provide arrangements and devices of the types heretofore referred to, of simple construction and effective over-all operation and rugged in design to meet the requirements of modern commercial railway operation.

These and other objects of the invention will become apparent in the course of the following description, and from an examination of the associated drawings, wherein:

FIGURES 4 and 5 are again detailed views illustrating the activation arrangement employed in the invention;

FIGURE 6 is an elevational view, fragmentary and partially in section, illustrating one form of a slack adjusting device that may be employed in combination in the brake rigging here under consideration;

FIGURES 10 and 11 are, respectively, plan and side elevational views of an alternate form of an adjuster that may be used in the disclosed rigging;

FIGURE 12 is an exploded view of the structure shown in FIGURES 10 and 11;

FIGURES 13 through 28, inclusive, are plan, partially fragmentary and partially sectional, views of the adjusting device of FIGURES 10 through 12, which illustrate the operation of the device under the various conditions normally incident to railroad operation; and FIGURE 29 is slightly modified arrangement of the invention.

Figure 1:
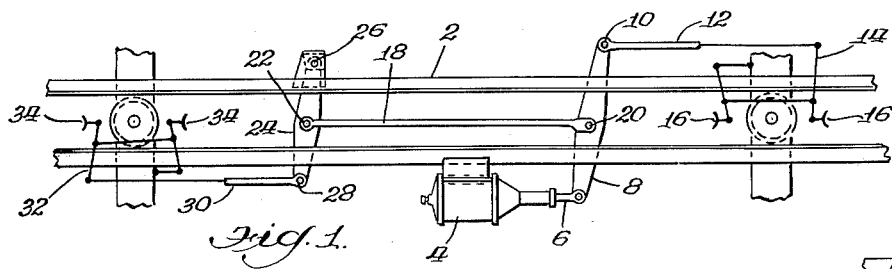
FIGURE 1 is a schematic plan view illustrating a typical brake rigging arrangement to which the disclosed invention may be applied.

Directing attention to FIGURE 1, it will be understood that there is here disclosed schematically a typical brake rigging currently employed in railway rolling stock. The numeral 2 represents a center sill of a typical freight car truck which has mounted thereon an air cylinder 4, said air cylinder having a connection (not shown) to a reservoir of fluid under pressure, such as air. A piston or push-rod 6 is operatively associated with a piston (not shown) which is mounted internally of the cylinder 4, said rod 6 extending outwardly from the cylinder and at its extremity is pivotally connected to one end of a live lever 8, said live lever 8 extending substantially transversely of the car and center sill. The opposite end of the live lever 8 is pivotally connected as at 10 to one end of a pull-rod 12, said pull-rod 12 being connected to an appropriate linkage indicated schematically at 14, which operatively attaches to brake shoes 16, 16 which in turn are mounted in braking relation to the periphery of the wheels on one truck of the car. A center rod 18 is pivotally connected at one end as at 20 to an intermediate portion of the live lever 8, said center rod 18 having its opposite extremity pivotally connected as at 22 to an intermediate portion of the dead fulcrum lever 24, said lever 24 being pivoted at one end thereof as at 26 in fixed or determined relation to the car and consequently the center sill 2. The opposite end of the lever 24 is pivotally connected as at 28 to another pull-rod 30, which in turn is operatively connected, as schematically illustrated, to a linkage arrangement indicated generally at 32, said last mentioned arrangement being associated with brake shoes 34, 34 which, in turn, are arranged in operative relation to the wheels of a second truck of the freight car.

Figure 2:
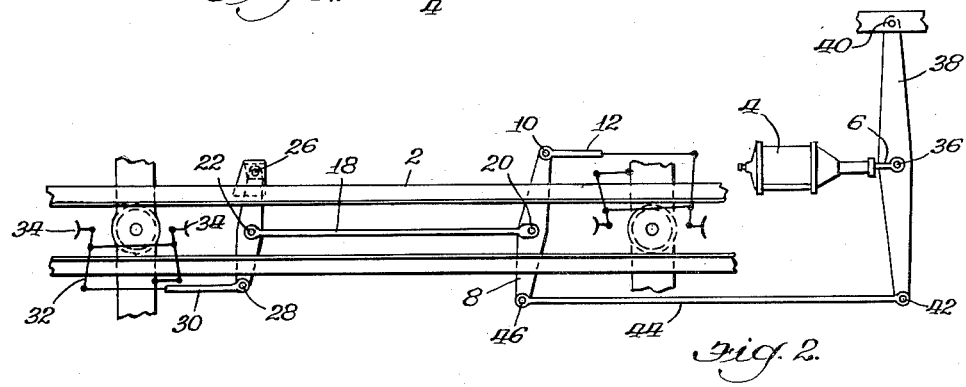
FIGURE 2 is also a schematic plan arrangement illustrating an alternate brake rigging frequency used in railroad operation.

Referring now to FIGURE 2, it will be apparent to those familiar with the art that the rigging arrangement here illustrated functionally is similar to that shown in FIGURE 1. However, in arrangements of this type, the brake cylinder 4 may be mounted on the car per se rather than on the center sill of the car, said brake cylinder having its push-rod 6 pivotally connected as at 36 to a vertically arranged dead or fulcrum lever 38, said lever 38 having its upper end pivoted as at 40 to the car body and having its lower end pivotally connected as at 42 to a pull-rod 44 which, in turn, pivotally connects as at 46 to one end of the live lever 8. Functionally, therefore, the only difference apparent between the structures of FIGURES 1 and 2 is a relocation of the brake cylinder and the provision of an appropriate connecting linkage whereby the power developed by the cylinder 4 may be transmitted to one end of the live lever 8.

Actuation Arrangement

Figure 3:
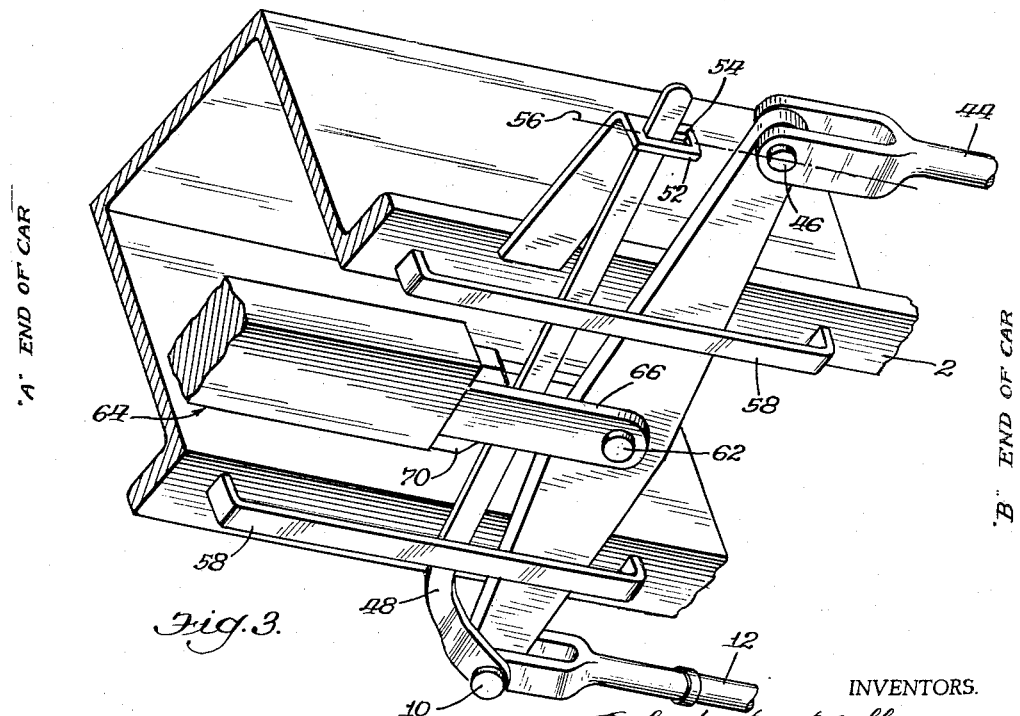
FIGURE 3 is a fragmentary, perspective view of the activator arrangement utilized in the disclosed invention.

Attention is now directed to FIGURES 3, 4 and 5 which illustrate in detail the actuation arrangement employed in the herein disclosed invention. The live lever 8 is again illustrated as extending transversely of the center sill 2, its opposed ends being pivotally connected at 46 and 10, respectively, to pull-rods 44 and 12. In FIGURE 3, the pull-rod 44 merely serves as a convenient means to connect the lever 8 to the power source 4. An activator lever 48 is pivotally connected as at 10 to one end of the live lever 8. It will be particularly noted that the activator lever extends angularly outwardly from the live lever 8 immediately adjacent its point of pivotal connection thereto. A short distance from the pivotal connection 10, the activator lever 48 is bent to extend substantially transversely of the center sill 2. At the opposite side of the center sill 2, a bracket 50 is mounted in fixed relation to said center sill, said bracket 50 having a bent portion 52 at the extremity thereof. It will be noted that the bracket 50 is provided with a slot 54 in the bent portion 52, said slot receiving in telescopic fashion the adjacent end of the activator lever 48. An important feature of the invention resides in the fact that the slot 54 accommodates slidable movement of the activator lever 48 therein and transversely of the center sill 2. This construction allows the activator lever 48 to fulcrum against opposed edges of the slot 54 under the action hereinafter described in detail. It will also be noted that in a preferred embodiment of the invention, the slot 54 is longitudinally aligned with the pivot 46 and the long axis of the pull-rod 44. In the structures shown in FIGURES 4 and 5, the slots 54 are longitudinally aligned with the line of movement of the push-rods 6 of the cylinders 4. Phantom lines 56 serve to illustrate this alignment. Guide brackets 58, 58 may be provided in fixed relation with the center sill to movably receive both the activator lever 48 and live lever 8 to retain same and aid in maintaining desirable planar movement of both of said levers under the action hereinafter described.

In order to accommodate distribution of braking force in opposed directions, a connecting link or rod indicated generally at 60 may be provided, having one of its ends pivotally connected as at 62 to an intermediate portion of the live lever 8. It will be apparent that the connecting link 60 may functionally duplicate the top rod 18 illustrated in FIGURES 1 and 2. Disposed in series relation in the connecting link 60 is a slack adjuster indicated generally and schematically at 64 in FIGURES 3, 4 and 5, it being understood that the slack adjuster may be any of the particular devices hereinafter disclosed and described in detail. In a preferred form of the invention, the pivotal connection between link 60 and live lever 8 (as at 62) may be accomplished by a bifurcated member 66 which is operatively connected to the slack adjuster 64 and is arranged to straddle the activator lever 48 and receive between its bifurcated portions the live lever 8. The opposite end of the slack adjusting device 64 may be conveniently connected in operative series relation to the link 60 which, in turn, may be connected to the fulcrum lever 24 in a manner similar to the connection between the center rod 18 and lever 24, as illustrated in FIGURES 1 and 2.

An important feature of the invention resides in providing the slack adjuster 64 with an abutment 70, said abutment 70 being horizontally aligned with the adjacent activator lever 48. It will also be understood and described in detail in relation to the particular slack adjusters hereinafter set out, that the abutment 70 is movable independently of and relative to the connection element 66.

Considering the operation of the activation arrangement, it will be well understood by those skilled in the art that upon brake application, the cylinder 4 urges the push-rod 6 to move outwardly. The outward movement of the push-rod 6, in either of the arrangements illustrated, induces movement of the live lever 8. Particularly, pivot end 46 of the live lever is moved away from the slack adjuster 64. For purposes of explanation, the letters A and B have been added to FIGURES 3, 4 and 5, and will be used to denominate the related end of the car. The described movement of the live lever 8 causes its pivot 10 to move in the direction of the A end of the car, while the pivotal connection 62 is moved toward the B end of the car. Thus, the braking force is transmitted to the B end of the car by the fulcruming action of the live lever about the pivot 62, and braking force is transmitted to the A end of the car by the fulcruming action of the live lever 8 about the pivot 10. In the course of the action described, and because of the movement of the pivot 10 toward the A end of the car, the activating lever 48 is caused to fulcrum in the slot 54 and itself is moved toward the A end of the car or toward the abutment 70 of the slack device 64. The activating lever 48 and the live lever 8 tend to separate and form a force triangle. In this connection, it is important to note that the movement of the pivotal connection 46 must be substantially linear. This is particularly true in the embodiments of FIGURES 4 and 5 wherein the live lever 8 is directly connected to the push-rod 6. Those familiar with the art understand that movement of the push-rod 6 must be linear in order to avoid binding as a result of the imposition of transverse forces resulting from the construction of the brake rigging itself. With this in mind, it is particularly desirable to locate the activating lever 48 intermediate the live lever 8 and the abutment 70. Also, linear movement of the pivot 46 will result in arcuate movement of the pivot 10, in turn changing the effective lever arm distance between the points 46 and 10. It is therefore important to provide the slotted fulcrum 54 for one end of the activating lever 48 to readily accommodate change in the mentioned lever arm distance by allowing the fulcrum point to vary. The importance of this structure will be understood when it is remembered that the live lever 8 will be moved through a considerable arc during all brake operation. This feature is also important in that it accommodates ready interchangeability of the structure here considered to various types of rolling stock equipment.

Referring specifically to FIGURE 4, it will be noted that the activating arrangement is here illustrated in released position. The activating lever 48 and the live lever 8 may be substantially parallel, and a considerable space exists between the activating lever 48 and the abutment 70. FIGURE 5 shows the arrangement with brakes applied under ideal or optimum conditions. Remembering that the cylinder 4 is designed for an optimum push-rod movement, it will be understood that the push-rod 6 has moved the optimum distance, inducing the aforementioned action of the live lever 8 which, in turn, has caused the activator lever to move into engagement with the abutment 70, but without inducing such movement thereof that will result in slack adjuster take-up. Superimposed on FIGURE 5 are phantom lines 74 which illustrate excessive movement of the push-rod 6 and the connected live lever 8 as a result of slack being present in the system. As a result of this action, it will be particularly noted that the activator lever 48 has caused a considerable relative movement between the abutment 70 and the connecting elements 66. Specifically, this movement of the abutment 70 may result from movement of the slack adjuster 64 into the activating lever 48 as a result of wear on the A end of the car, or movement of the activating lever 48 into the abutment 70 as a result of wear on the B end of the car. Of course, in the usual instance, a combination of both of said movements result from wear occurring on both ends of the car. Therefore, it will be understood that the coaction between the activating lever 48 and the abutment 70, and particularly the induced relative movement between the abutment 70 and the elements 66, is substantially proportional to the wear existent in the brake rigging system. It will thus be apparent that in order to remove the slack resulting from wear in the system and return the push-rod to its optimum and desired stroke, it becomes necessary that the slack adjusting device 64 employed in the arrangement operate to move the connected pivot points 62 and 22 toward each other in order to compensate for wear and return the rigging to a condition wherein substantially the desired braking forces will be transmitted to both ends of the car and normal clearance is provided between the shoes and wheel.

Slack Adjusting Device

Figure 7:
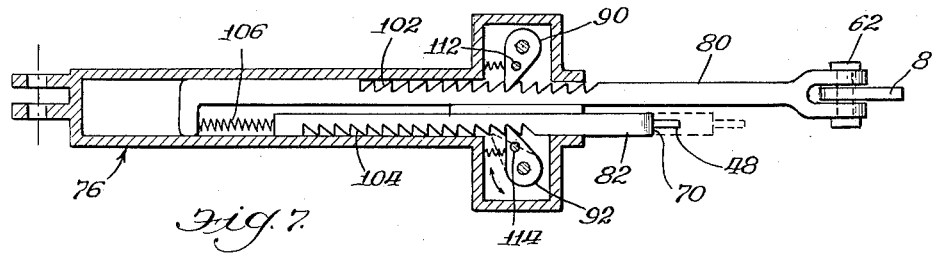
FIGURE 7 is a view similar to FIGURE 6, illustrating the device of FIGURE 6 under the action of a measuring stroke.
Figure 8:
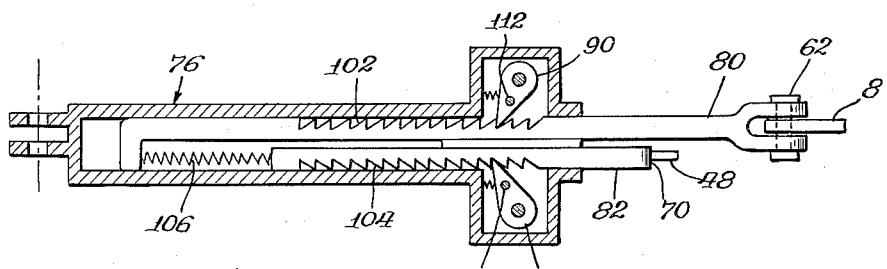
FIGURE 8 is the device of FIGURE 6 after the measuring stroke of FIGURE 7 and upon slack removal.

Attention is now directed to FIGURES 6, 7 and 8 which illustrate a first form of a slack adjusting device that may be employed in combination with the activating arrangement described above. Specifically referring to FIGURE 6, it will be noted that the slack adjusting device is here shown in elevation with one of the sides thereof removed to provide a clear view of the operating parts. The device itself comprises a load housing indicated generally at 76, having one end thereof directly connected via link 60 to the fulcrum lever 24. The load housing 76 is provided with an aperture 78 at one end thereof to telescopically receive a load distributing member 80 and a measuring member 82. The walls of the load housing and guide 84 cooperate to accommodate longitudinal movements of the load member and measuring member in said housing. The member 80 is provided with connecting elements which pivotally connect the member 76 to the live lever 8, as at 62. The load housing further comprises winged sections 86 and 88 which provide space for a load pawl 90 and activating pawl 92, respectively. Load pawl 90 is pivotally and directly connected to load housing via the pivot 94, while the activating pawl is pivotally and directly connected to the load housing via the pivot 96. Spring means 98 and 100, respectively, are in pressured interposition between the load housing and the respective pawls 90 and 92, and eccentrically engage the latter whereby the pawls are biased toward a load rack 102 and a measuring rack 104, respectively. A take-up spring 106 is provided and physically connects adjacent ends of the load member and measuring member. It will be noted that one end of the measuring member 82 is provided with the abutment 70 which is horizontally aligned with the activating lever 48 hereinbefore referred to.

FIGURE 6 shows the slack adjusting device in "brakes applied" condition with normal rigging, i.e., a no-wear condition. In such an application, the activating lever 48 has moved into light engagement with the abutment 70 of the measuring member 82, but there has not been sufficient movement of the latter to induce much energy in the take-up spring 106. Braking pressure is, of course, distributed from the live lever 8 through the load member 80 and the load rack 102 to the load pawl 90, and from thence via the pivot 94 to the load housing and finally to the lever 24 via the link arrangement 60.

FIGURE 7 illustrates the adjusting device of FIGURE 6 during a measuring stroke. In this figure, it will be understood that the activating lever 48 has, as a result of wear in the system as hereinbefore explained, engaged the abutment 70 and caused the measuring member 82 to move longitudinally relative to the load housing 76, thereby inducing energy in the spring 106. The compressive energy, of course, is induced by the longitudinal movement of the measuring member, while the load member 80 is maintained in fixed position relative to the housing by virtue of the locking effect of pawl 90 and the distribution of braking force through the load member and pawl 90 and housing 76. Of course, it will be understood that the activator pawl 92 will ratchet over the measuring rack 104 as contact between the activating lever 48 and the abutment 70 induces motion of the measuring member. Thus, in the "brakes applied" position, we have stored up considerable energy in the take-up spring 106. Upon release of the braking force, relaxing the position of the live lever 8 and reversing the movement thereof, the energy stored in spring will induce a movement of the load member 80. In effect, the linking member 60 earlier mentioned, and which the slack adjuster device 76 forms a series part thereof, is shortened to compensate for the slack which now appears in the system. The take-up in the slack above described is graphically illustrated in FIGURE 8, wherein the load pawl 90 has taken a new position on the load rack 102.

Figure 9:
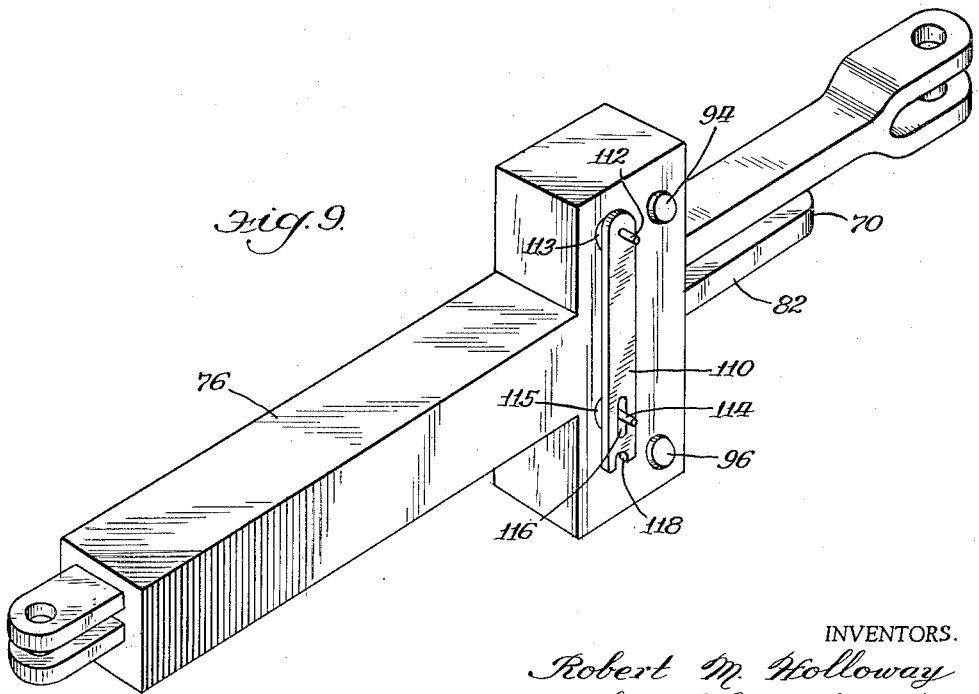
FIGURE 9 is a perspective view of the structure of FIGURES 6 to 8, and illustrating the pawl control feature.

Turning to FIGURE 9, it will be noted that a pawl control element 110 is provided. The load pawl 90 and the activator pawl 92 are provided with fixed pins 112 and 114, respectively. These pins project outwardly through aligned apertures 113, 115 in the housing 76, whereat pin 112 is snugly received in an aperture at one end of the element 110 and pin 114 is rather loosely received in slot 116 at the other end of the element 110. The element 110 therefore so operatively interconnects the pawls so that the pawls sequentially may be disengaged from their related racks. By so limiting the pawls to sequential action, false or accidental slack take-up is avoided under such conditions as, for example, train impacts.

Recess 118 may be provided on one end of element 110 to selectably engage pin 114 so that both pawls may be held out of engagement with the related racks to accommodate easy rigging adjustment when desired, such as during new shoe installation.

*Modified Slack Adjusting Device*

Attention is now directed to FIGURES 10 through 16 which illustrate an alternate slack adjusting device that may be employed in combination with an activating arrangement such as, for example, was heretofore described. The slack adjuster here disclosed comprises a load housing 120 which pivotally carries a load pawl 122 and an activating pawl 124. At one end the load housing 120 is provided with a bifurcated portion 126, said housing additionally having an aperture 128 therethrough which communicates with the portion intermediate the bifurcated end 1236. A load distributing member 130 is provided with extended bosses 132 at one end thereof, and is also provided at the other end thereof with a pivot aperture 134 for connection as will hereinafter be explained. A load rack 136 and a measuring rack 138 are provided on the load member 130. The load member 130 is telescopically received in the aperture 128 of the housing 120, such reception being such that the bosses 132 and adjacent end of the load member 130 fall within the bifurcated portion 126 in such a manner that the load spring 140 may be compressively interposed between the bosses 132 of the load member and between abutments 141, 141 of the load housing 120. A measuring member, indicated generally at 144, is also provided—said measuring member comprising in this embodiment a pair of identically constructed plates 146 and 148. The plates may be preferably arranged to generally conform to the physical contour of the housing member 120, it being understood that the device as assembled has the housing 120 interposed between the plates 146 and 148 of the measuring member 144. Each measuring member plate 146 and 148 is provided with a pair of linearly elongated slots 150, 152. The slots 150 and 152 receive pivot pins 154 and 146, respectively. It will be noted that the pivot pin 154 extends through the slot 150 and through pivotal apertures 158 of the load housing 120, whereby the pivot pin 154 pivotally connects the actuating pawl 124 to the load housing. The pivot pin 156 is received in the related slots 152 of the measuring member and also extends through apertures 160 in the load housing 120 to pivotally connect the load pawl 122 to the load housing 120. Immediately adjacent the slot 152 of the measuring member, said member is also provided with a non-linear cam slot 162. It will be noted that the cam slot 162 is physically aligned with aperture 164 in the load housing 120. The load pawl 122 has rigidly mounted therein a cam follower 166 which extends through the aperture 164 to register in the congruent cam slots 162 of the respective plates of the measuring member 144. Similarly, the elongated slot 150 has a non-linear cam slot 168 immediately thereadjacent which registers with an aperture 170 in the load housing. The activator pawl 124 is provided with a fixed cam follower 172 whereby the follower extends through the aperture 170 of the load housing and into registry with the cam slots 168 in the measuring member.

Another abutment 174 is fixedly secured in any suitable manner as, for example, by a pivot pin 176 to the bifurcated portion 126 of the housing 120, and specifically in a spaced relation to the end of said bifurcated portion. A second abutment 178 is fixedly secured to the measuring member 144 in any suitable manner as, for example, by a pivot pin 180. In the preferred embodiment, the pin 180 is also in registry with an elongated linear slot 182 in the bifurcated portion of the housing member 120, thereby accommodating motion between abutment 178 and the bifurcated portion 126 of the housing member 120. With the arrangement described, a second or actuating spring 184 may be compressively interposed between the abutments 174 and 178.

Turning specifically to FIGURES 10 and 11, which illustrate the adjuster in a "brakes relaxed" position, it will be apparent that in such position the cam slots 162 and 168 by their reception of the respective followers 166 and 172 hold the activator pawl 124 in registry with the related measuring rack 138 while the load pawl 122 is held out of engagement with the related load rack 136. It will also be apparent from the construction of the cam slots 162 and 168 that any relative movement between the load housing 120 and the measuring member 144 in the direction which will carry the followers 166 and 172 along their respective cam slots, will result in the following action (see FIGURES 13 to 15)— namely, an immediate outward movement of the activator pawl 124 to disengage same from the measuring rack 138. Concurrently therewith, the load pawl 122 is maintained out of engagement with the load rack 136 because its slot 162 is initially linear. Continued movement after disengagement of the activating pawl will find the follower 166 contacting the stepped portion 186 in the associated cam slot 162, whereby the activator pawl 122 is urged to bias itself toward and into engagement with the load rack 136. Continued relative movement in the same direction will maintain the load pawl 122 in registry with the rack 136, and will maintain the activating pawl 124 out of registry with the measuring rack 138. It will be particularly noted that for a short interval of relative motion, both the activating pawl 124 and the load pawl 122 are out of registry with their related racks. Thus, it will be seen that FIGURE 13 illustrates the arrangement in normal position. FIGURE 14 shows the device in intermediate or take-up position with both load and activator pawls disengaged. FIGURE 15 illustrates the "brakes applied" position with the load pawl engaging rack 136 and pawl 124 disengaged.

Upon reversal of the mentioned motion and return of the measuring member 144 and the load housing 120 into congruency, the reverse action takes place. That action is as follows: the cam follower 166 first urges the load pawl 122 out of registry with the adjacent and related load rack 136. Concurrent with this last mentioned action, the activator pawl 124 is maintained out of engagement with the associated measuring rack 138. Again, at this point, a take-up position results with both pawls out of engagement with related racks. Continued movement will result in the follower 172 striking the portion 188 of the cam slot 168, whereupon the activating pawl 124 is biased toward and into engagement with the related measuring rack 138.

Turning now to the application of the adjuster described in the last embodiment in combination with a typical brake rigging, attention is directed to FIGURES 16, 17, 18 and 19. Considering these figures, it will be understood that the end 134 of the load member 130 on the left side of each drawing may be operatively connected in any conventional manner to, for example, the dead lever 24 of FIGURES 1 and 2. On the other hand, the bifurcated end portion 126 of the load housing 120 is operatively connected as by pin 62 to, for example, the live lever 8 and as illustrated in FIGURES 1, 2 and 3. This showing, of course, is partly in elevation and partly in section to more clearly illustrate the action hereinafter described, it being particularly noted that plate 146 of the measuring member 144 is removed to illustrate pawl action. The activating lever 48 earlier described is also fragmentarily shown.

FIGURE 16 illustrates the adjuster in a "brakes relaxed" condition with the activator lever separated from the abutment 70 earlier described. Upon initial brake application, the adjuster is moved physically in space toward the B end of the car, as shown in FIGURE 17, bringing lever 48 into engagement with the abutment 70. It will be understood that the phantom lines 190 and their spaced variation from figure to figure illustrate actual adjuster motion during brake application. FIGURE 17 thus illustrates the arrangement of the parts about the time the connected brake shoes (not shown) are brought into engagement with related wheel surfaces. Noting FIGURE 18, it will be apparent that under the action of the brake cylinder a further motion of the cylinder lever 8 is induced which results in movement of the connections 62 toward the B end of the car while connection 134 remains fixed in space. As a result of this movement, the load housing 120 is urged to move toward the B end of the car, further compressing the load spring 140 and the activator spring 184 as a result of the concurrent movement of the housing connected abutments 141 and 174. This action causes a relative motion between the housing 120 and the measuring member 144, as illustrated in FIGURE 18, which results from the limiting effect of the engagement between the activator lever 48 and the abutment 70 which is connected to the measuring member 144.

The motion thus described first urges the activator pawl 124 out of engagement with the measuring rack 138 as above described. At this point and as illustrated in FIGURE 18, both the activator pawl 124 and the load pawl 122 are out of engagement with their respective racks and there is no direct mechanical non-flexible link between the pivot connections 62 and 134. Brake application force is, therefore, distributed through the load housing 120 and to the spring 140, and from thence to the brake rigging at the A end of the car. Slight additional movement of the lever 8 during brake application causes the load pawl 122 to be biased downwardly into direct mechanical connection with the load rack 136. This action is illustrated in FIGURE 19, it being particularly noted that the load spring 140 and the activating spring 184 are further compressed. This movement reflects a movement of the push-rod up to the optimum point earlier described. However, all braking force is transmitted from the connection 62 through the load housing and the load pawl 122 and directly to the load member 130, and from thence to the A end of the car. FIGURE 19 then illustrates the "brakes on" position and the relative displacement between the load housing 120 and the measuring member 144. If desired, springs may be arranged to pressure-engage the pawls 122 and 124, as in the embodiment of FIGURE 6 to aid in biasing said pawls toward the related racks.

Before turning to the action during brake release, attention is directed to FIGURE 20 which illustrates the adjuster action which would be expected when a condition affording false excessive piston travel becomes apparent in the system. This, of course, as earlier explained, could result from the flexible deflection or deformation of portions of the brake rigging. FIGURE 20 assumes such false piston travel results from deflection at both the A and B ends of the car, whereby the pivot points 134 and 62 are both moved to the right, as illustrated by the lines 196. The result of such a condition is a continued and more pronounced relative movement between the measuring member 144 and the load housing 120, as noted by the continued movement of the cam followers connected to the pawls to the right and in their cam slots. However, the load pawl 122 is still firmly locked in a fixed position relative to its load rack and the load member 130, and the distance separating connection points 62 and 134 remains constant.

Upon brake release, it will be understood that the entire body of the adjuster is moved toward the A end of the car first—that is, it returns to the position shown in FIGURE 19 which avoids reflecting the deflection or false piston travel which has occurred. The relative position between the load housing 120 and the load member 130 is still the same because the load pawl 122 is firmly locked within its related load rack 136. Continued relaxation of the brakes causes the activating lever 48 to move toward the B end of the car, accommodating expansion of the activating spring 184 and resulting in relative movement between measuring member 144 and load housing 120, whereby the cam action biases the load pawl out of engagement with the load rack 136. At this point, the activating pawl 124 is still out of engagement with the load rack 138, and adjustment under the action of the load spring 140 could occur if slack had been induced in the system as a result of wear during the brake application. This condition is illustrated by FIGURE 18. Continued motion of the rigging to the "brakes relaxed" position, of course, urges the slack adjuster to take up the position of FIGURES 17 and 16, respectively, and in that sequence. It will be particularly noted that no appreciable wear and slack having occurred in the system, the activator pawl is now engaged with the measuring rack 138 and the relative position between the load housing 120 and the load member 130 is identical with what it was before brake application, and accordingly proper shoe and wheel clearance still exists in the braking system.

Now, assume a condition of slack existent in the rigging as, for example, a result of shoe wear. FIGURE 20 illustrates the "brakes applied" condition during which the wear took place. Of course, wear induced during brake application will cause a creeping of and excessive piston and push-rod movement during that application. FIGURE 21 indicates the first action of the rigging at the inception of brake release, and particularly the fact that reverse movement of the live lever 8 will result in the entire slack adjuster (in the connections 134 and 62) moving toward the A end of the car. Phantom lines 196 show the center lines of connection of FIGURE 20. The activating spring 184 is now allowed to expand against the resistance offered by lever 48. This moves the measuring member relative to the load housing 120. Pawl action is, of course, as above described—namely, the load pawl 122 becomes disengaged from the load rack 136 and as illustrated in FIGURE 22. Upon disengagement of the load pawl 122, the compressed load spring 140 is effective to induce a relative motion between the housing 120 and the member 130. This action, of course, moves the connection points 134 and 62 toward one another and, as illustrated in FIGURE 22, such center distance shortening is effective to initiate removal of slack from the system.

It will be understood that the actuating lever 48 during wear has moved the measuring member in space to a point whereat its location reflects the wear in the system. Continued expansive action of the load spring 140 accomplishes further slack elimination by urging the housing member 120 toward the A end of the car (FIGURE 23) until it comes into registry with the measuring member 144, whereupon the measuring member biases the activating pawl 124 into locked engagement with the measuring rack 138 at a new position. The final action of the rigging during brake relaxation is continued movement of the entire slack adjuster toward the A end of the car, and separation of the abutment 70 and activating lever 48, as illustrated in FIGURE 16. The rigging is now ready for a further brake application at optimum piston travel and with proper shoe and wheel clearance.

Those familiar with the art will understand that after brake shoes are worn a determined amount, replacement must be undertaken. The instant slack adjuster embodiment generally avoids the requirement of manual rigging and adjuster relaxation to install new shoes, and subsequent manual adjuster resetting. This feature has the advantages of labor-saving as well as avoiding mechanical error during rigging readjustment. With the above in mind, attention is now directed to FIGURES 24 and 25 which illustrate the adjuster position after worn shoes have been replaced with new shoes, the adjuster initially being brought into braking position. In effect, the clearances between the wheels and brake shoes are no longer optimum, and except for the adjuster action hereinafter described, brake application would result in short piston travel. It will be particularly noted that the activating lever 48 has not come into contact and engagement with the abutment 70. As a result, continued movement of the connection 62 (FIGURE 25) toward the B end of the car pulls the load housing 120 into the load spring 140, which of course is arranged to bear against the abutments 132 of the load member 130.

The power delivered to the adjuster by the cylinder is, of course, considerably stronger than the resistive force available at the load spring 140, and accordingly, movement of the connection 62 toward the B end of the car will cause the adjuster and particularly the activating pawl 124 to ratchet along its related measuring rack 138, the adjuster letting out or increasing the center distance between the connections 134 and 62. This ratcheting action is illustrated in FIGURE 25, and will continue until the activating lever 48 is brought into such firm engagement with the abutment 70 that relative motion in one direction between the measuring member 144 and the housing 120 will ensue. This, of course, occurs shortly before the point of optimum piston/push-rod travel. Thereafter, the sequence of operations illustrated in FIGURES 18 and 19 will occur, and the brakes will be fully applied with the piston/push-rod travel at optimum. Also, the center distance between the connections 62 and 134 will be approximately optimum. Upon brake relaxation, the reverse action takes place, and the actuating pawl 124 will engage the measuring rack 138 at a location that reflects both the correct center distance between the connections 134 and 62 and optimum push-rod travel. Thus, it will be seen that even after shoe renewal the first brake application is at the desired optimum, and proper shoe and wheel clearance thereafter results.

FIGURES 26 through 28 illustrate the action in response to the accidental occurrence of an extreme slack condition as, for example, when brake shoes are lost accidentally during train operation. This obviously would result in extremely excessive piston travel and faulty brake application. Turning specifically to FIGURE 26, it will be apparent that piston actuation and resulting movement of the lever 8 will urge the activating lever 48 into engagement with the abutment 70 before the brake shoes become engaged with the wheel. This, of course, is due to the extreme wear condition artifically induced by lost shoes. Engagement between the abutment 70 and the lever 48, and continued motion of the actuating piston, induces relative movement between the housing 120 and the measuring member 144 and results in pawl disengagement as above described. On pawl disengagement, the action of the compressed load spring 140 immediately urges the housing 120 toward the A end of the car and the load member 130 toward the B end of the car, which induces an immediate reduction in center distance between the points of connection 134 and 62. This action is illustrated in FIGURE 27.

When the correct center distance is achieved, continued piston travel and arcuate movement of the lever 8 moves the point of connection 62 and housing 120 toward the B end of the car, while the engagement between the abutment 70 and lever 48 resists movement of the measuring member 144, thus bringing the load pawl into locked engagement with the load rack as described and illustrated in FIGURE 28. Brakes are now applied at the optimum point as desired. It will be noted that the extreme slack condition resulting from lost shoes was removed before full brake application. Of course, upon relaxation of the brake rigging, the reverse action earlier described will occur, and the rigging will return to a relaxed slack-free position.

Directing attention to FIGURE 29, it will be noted that a slight modification of the adjuster of FIGURES 10 and 11 is shown. Particularly, a single rack 200 is provided, a single pivotally movable member 202 carries both a load pawl 204 and activating pawl 206, it being understood that one portion of the rack 200 serves as a measuring rack and another portion thereof serves as the load rack. A single cam arrangement 208 provides for the sequential engagement of the pawls, and in other respects the structure is similar to FIGURES 10 and 11.

In any of the arrangements illustrated, means other than the equivalent means may be substituted for any of the operating parts. For example, controlled frictional connector means may be substituted for the rack and pawls, and other resilient means such as rubber may be substituted for the coiled springs illustrated. It will also be understood that the adjusting devices are believed to be most efficiently applicable to the top center rod whereby they can most easily be combined with the activating arrangement associated with the live lever. However, the adjusting devices may also be applied in the connecting linkage locations where power is being transmitted, merely by changing the activating arrangement such as by providing a fixed activating lever or the like.

It will be understood that mention of optimum design distances and other technical design features herein, has reference to the requirements and specifications which at this time have been promulgated in the industry by Association of American Railroads, and reference is had thereto for a detailed understanding.

Thus, it will be seen that the disclosed invention provides a unique arrangement for slack adjuster actuation which may be combined with several novel slack adjuster designs as herein illustrated, to efficiently and effectively accomplish the elimination of slack in railroad brake riggings or in any similar device, wherein slack-free operating conditions are required and necessary for efficient power transmission.

The invention as shown is by way of illustration and not limitation, and may be subject to various modifications without departing from the spirit thereof or the scope of the appended claims.

What is claimed is:
1. A slack adjusting device for interconnecting portions of a brake rigging having a slack adjusting device activator, said device comprising a load housing member adapted to be connected to one part of the rigging, a load member adapted to be connected to another part of the rigging, the load member being movably carried by the housing member, resilient load means, means connecting said resilient load means between said housing member and the load member, said resilient load means acting therebetween to urge said housing member in a first direction and said load member in a second direction, a measuring member movably carried by the housing member and adapted to engage said activator to arrest movement of the measuring member and thereby induce relative movement between it and the housing member upon a predetermined movement of the rigging, a pair of means carried by at least one of said members for providing a pair of alternate driving connections between said housing member and said load member for alternately preventing movement of said housing member and said load member with respect to each other in said directions, and control means interconnecting said measuring member and said pair of means, said control means operating one of said pair of means in a first predetermined position of said measuring member with respect to said housing member for providing one of said pair of alternate driving connections and operating the other of said pair of means in a second predetermined position of said measuring member with respect to said housing member for providing the other of said pair of alternate driving connections.

2. A slack adjusting device according to claim 1 wherein said pair of means for providing said driving connections comprises a pair of pawls on one of said housing and load members and a rack on the other of said housing and load members, said control means comprising cam means which interconnects said measuring member and said pawls, said cam means moving one of said pawls into engagement with the rack and moving the other of said pawls out of engagement with said rack in said first position of said measuring member and vice versa in said second position of said measuring member, said device further including additional resilient means acting between said measuring member and said housing member for urging said measuring member into said first position.

3. A slack adjusting device as an article of manufacture, comprising a load housing, a load member movably carried by the housing, first resilient energy storing means acting between said housing and said load member, a measuring member carried by said housing for movement relative thereto, second resilient means acting between said measuring member and said housing tending to bias same into predetermined positions with respect to each other, a first engaging means on said housing engageable with said load member for providing a driving connection between said housing and said load member, a second engaging means on said housing engageable with said load member for providing a direct connection between said housing and said load member, and control means operatively interconnecting said measuring member and said first and said second engaging means, said control means alternately moving said first engaging means into engagement with said load member in said positions of said housing and said measuring member and moving said second engaging means into engagement with said load member with said housing and said measuring member in different relative positions.

4. A slack adjusting device for interconnecting portions of a brake rigging having a slack adjusting device activator, said device comprising a load housing member having a portion adapted to be connected to one part of the rigging, a load member having a portion adapted to be connected to another part of the rigging, the load member being movably carried by the housing member, resilient load means, means connecting said resilient load means between said housing member and the load member, said resilient load means acting therebetween to urge said portions of said housing member and said load member in the direction toward each other, a measuring member movably carried by the housing member and adapted to engage said activator to arrest movement of the measuring member and thereby induce relative movement between it and the housing member upon a predetermined movement of the rigging, a pair of means carried by at least one of said members for providing a pair of alternate driving connections between said housing member and said load member for alternately preventing movement of said portions of said housing member and said load member in said direction and in the opposite direction, and control means interconnecting said measuring member and said pair of means, said control means operating one of said pair of means in a first predetermined position of said measuring member with respect to said housing member for providing one of said pair of alternate driving connections and preventing said movement in said first-mentioned direction and operating the other of said pair of means in a second predetermined position of said measuring member with respect to said housing member for providing the other of said pair of alternate driving connections and preventing movement in said opposite direction and said resilient load means acting between said housing and load members and being effective to urge said portions toward each other in the absence of said one driving connection.

5. In a brake rigging arrangement for a railroad car having a linearly movable power source, a live lever pivotally connected at one portion thereof to said source, a dead lever in spaced relation to said live lever, and a slack adjusting device connected at opposite ends to said levers and comprising a measuring member movable with respect to other portions of said device and having an abutment thereon adjacent but spaced from said live lever, the combination therewith of a rigid, one-piece, activator lever having one end pivoted on said live lever at a point thereon spaced from said one portion thereof, said activator lever extending from said point on said live lever toward said one portion of said live lever and being engageable with said abutment upon brake application and consequent movement of said live lever, and fixed bracket means supported from said car adjacent the opposite end of said activator lever and having an aperture therein, the opposite end portion of said activator lever extending through said aperture and slidably engaging said bracket means and said aperture being larger than said end portion in the direction of movement of said live lever thereby permitting said end portion of said activator lever to move in a direction extending lengthwise thereof and to move a predetermined distance extending transversely thereto.

6. In a brake rigging arrangement for a railroad car having a linearly movable power source, a live lever pivotally connected at one portion thereof to said source, a dead lever in spaced relation to said live lever, and a slack adjusting device connected at one end to said dead lever and at its opposite end to an intermediate portion of said live lever and comprising a measuring member movable with respect to other portions of said device and having an abutment thereon adjacent but spaced from said live lever, the combination therewith of a rigid, one-piece, activator lever having one end pivoted on said live lever at a point thereon spaced from said one portion thereof and from the point of connection of said device thereto and on the side of said intermediate portion opposite from said one portion, said point of connection being intermediate said first mentioned point and said one portion, said activator lever extending from said point on said live lever toward said one portion of said live lever and between said live lever and said abutment and being engageable with said abutment upon brake application and consequent movement of said live lever, and fixed bracket means supported from said car adjacent the opposite end of said activator lever and having an aperture therein, the opposite end portion of said activator lever extending through said aperture and slidably engaging said bracket means and said aperture being larger than said end portion in the direction of movement of said live lever, thereby permitting said end portion of said activator lever to move in a direction extending lengthwise thereof and to move a predetermined distance extending transversely thereto.

7. A slack adjusting device comprising a load housing, a load member movably mounted on said housing, rack means movable by said load member, spring means acting between said housing and said load member and urging said housing and said load member in opposite directions, a pair of oppositely acting pawls mounted on said housing and engageable with said rack means, a measuring member movably supported by said housing and having cam means engageable with said pawls, said cam means alternately moving said pawls into engagement with said rack dependent upon the position of said measuring member with respect to said housing.

8. A slack adjusting device comprising a load housing, a load member movably mounted on said housing, said load member having rack means thereon, spring means acting between said housing and said load member and urging said housing in a first direction and said load member in a second direction, a pair of oppositely acting pawls mounted on said housing and engageable with said rack means, a measuring member movably supported by said housing and having cam means engaged with said pawls and spring means acting between said measuring means and said housing and urging said measuring means in said second direction, said cam means moving one of said pawls into engagement and the other of said pawls out of engagement with said rack when said measuring member is in a first position with respect to said housing and moving said other pawl into engagement and said one pawl out of engagement with said rack means when said measuring member is in a second position with respect to said housing.

9. A slack adjusting device comprising a load housing, a load member movably mounted on said housing, said load member having rack means thereon, spring means acting between said housing and said lever and urging said housing in a first direction and said load member in a second direction, a pair of oppositely acting pawls mounted on said housing and engageable with said rack means, a measuring member movably supported by said housing and having cam means engaged with said pawls and spring means acting between said measuring means and said housing and urging said measuring means in said second direction, said cam means moving one of said pawls into engagement and the other of said pawls out of engagement with said rack when said measuring member is in a first position with respect to said housing, disengaging both of said pawls from said rack means when said measuring member is in a second position with respect to said housing and moving said other pawl into engagement and said one pawl out of engagement with said rack means when said measuring member is in a third position with respect to said housing.

10. A slack adjusting device according to claim 9 wherein said rack means comprises a pair of racks on opposite sides of said load member and said pawls are mounted on different portions of said housing, one of said pawls being engageable with one of said racks and the other of said pawls being engageable with the other of said racks.

11. A slack adjusting device according to claim 9 wherein said rack means comprises a single rack and said pawls are both engageable with said rack.

12. A slack adjusting device according to claim 11 wherein said pawls are joined together and are pivotally mounted on said housing on a common pivot axis.

References Cited in the file of this patent

UNITED STATES PATENTS

| | | |
|---|---|---|
| 535,774 | Sewall | Mar. 12, 1895 |
| 1,837,473 | Neveu | Dec. 22, 1931 |
| 1,908,315 | Bryant | May 9, 1933 |
| 1,951,014 | Gallusser | Mar. 13, 1934 |
| 2,559,779 | Martin | July 10, 1951 |
| 2,922,500 | Schultz | Jan. 26, 1960 |